United States Patent [19]

Hudson

[11] Patent Number: 4,954,613

[45] Date of Patent: Sep. 4, 1990

[54] CATALYTIC PREPARATION OF POLYCARBONATE FROM DIALKYL CARBONATE AND BIS PHENOL DICARBOXYLATE

[75] Inventor: Barry Hudson, Beverley, United Kingdom

[73] Assignee: BP Chemicals Limited, London, England

[21] Appl. No.: 326,568

[22] PCT Filed: Jul. 14, 1988

[86] PCT No.: PCT/GB88/00568

§ 371 Date: Mar. 7, 1989

§ 102(e) Date: Mar. 7, 1989

[87] PCT Pub. No.: WO89/00590

PCT Pub. Date: Jan. 26, 1989

[30] Foreign Application Priority Data

Jul. 15, 1987 [GB] United Kingdom ................ 8716675

[51] Int. Cl.$^5$ .............................................. C08G 64/30
[52] U.S. Cl. ...................................... 528/371; 526/67; 526/68; 528/196; 528/271; 528/370
[58] Field of Search ............... 528/371, 370, 271, 196; 526/67, 68

[56] References Cited

U.S. PATENT DOCUMENTS 4,452,968  6/1984  Bolon et al. ......................... 528/371

*Primary Examiner*—Harold D. Anderson
*Attorney, Agent, or Firm*—Brooks Haidt Haffner & Delahunty

[57] ABSTRACT

This invention relates to an integrated process for producing polycarbonates by transesterification of a dialkyl carbonate with a bisphenol diester to form a carbonate oligomer and an alkyl ester followed by polymerization of the oligomer to a polycarbonate. The feature of the invention lies in the carbonylation of the alkyl ester by-product formed during the transesterification step to an ahydride which is used to esterify bisphenol to the diester.

6 Claims, No Drawings

CATALYTIC PREPARATION OF POLYCARBONATE FROM DIALKYL CARBONATE AND BIS PHENOL DICARBOXYLATE

The present invention is an integrated process for the production of polycarbonates from bisphenol diesters.

Polycarbonates have hitherto been produced by reacting bisphenol A, phosgene and caustic soda in a phase transfer reaction. However, the known toxicity of phosgene and the problems of disposal of by-product sodium chloride from this reaction resulted in efforts being made to produce the polycarbonate by a non-phosgene route.

One such route is claimed and described in U.S. Pat. No. 4,452,968 which is an integrated process for producing polycarbonates by
(a) reacting an alkanol with carbon monoxide and oxygen to form a dialkyl carbonate;
(b) reacting the dialkylcarbonate from (a) with a bisphenol diester e.g. the diacetate, in the presence of a catalyst to form an oligomer and an alkyl ester;
(c) separating the alkyl ester from (b) and heating it to produce ketene and the alkanol used in (a) above;
(d) reacting the ketene with the bisphenol to form the bisphenol diester used in step (b); and
(e) heating the oligomer in step (b) in the presence of a catalyst to form the polycarbonate resin.

The above process has some disadvantages in that the amount of ketene produced from the alkyl ester by heating it as in step (c) is inadequate for operating a continuous process. Hence additional ketene has to be added to the bisphenol in step (d) in order to form commercially viable amounts of the bisphenol diester. Since ketene is not an article of commerce, it must be manufactured on-site by e.g. pyrolysis of acetic acid in the presence of a catalyst at elevated temperature e.g. 700°-800° C. Thereafter the ketene has to be separated from the pyrolysis products before use for reaction with bisphenol.

The additional capital costs involved in setting up a ketene manufacturing facility and the high heat energy requirements of the relevant process adversely affect the economics of the process for producing polycarbonate resin using ketene as a key reactant. Moreover, the reaction product of ketene and bisphenol is a mixture of bisphenol mono acetate and diacetate, the mono acetate having to be further acylated by reaction with acetic anhydride.

It has now been found that the use of ketene may be avoided if the integrated process is modified to convert the by-product alkyl ester to e.g. acetic anhydride by hydrocarbonylation and the acetic anhydride can be used to produce the bisphenol diester directly.

Accordingly, the present invention is an integrated process for producing polycarbonates, said process comprising:

A. reacting in a transesterification reaction a dialkyl carbonate with a bisphenol diester in contact with a catalyst to form a carbonate oligomer and an alkyl ester, and separating the alkyl ester from the oligomer;

b. carbonylating the alkyl ester from step A with carbon monoxide in the presence of a carbonylation catalyst to form a product comprising an anhydride;

C. reacting the product comprising the anhydride from step B with a bisphenol to form the bisphenol diester, and recycling the diester to step A; and D. heating the oligomer from step A in contact with a catalyst to form the polycarbonate.

The dialkyl carbonate used in step A may be derived by reacting an alkanol with carbon monoxide and oxygen or by reacting an alkylene oxide with carbon dioxide initially to form an alkylene carbonate which is subsequently reacted with methanol. Where the dialkyl carbonate is derived from an alkanol, the alkanol is preferably a primary alkanol in which the alkyl group has 1-4 carbon atoms, most preferably 1-2 carbon atoms.

The dialkyl carbonate reactant is suitably dimethyl carbonate or diethyl carbonate, most preferably dimethyl carbonate. The method of producing dialkyl carbonates used in the process described in step A is well known in the art. For instance, the reaction between an alkanol, carbon monoxide and oxygen may be carried out in the presence of a catalyst such as salts of palladium, platinum or an organometallic complex of copper, use of cupric chloride being preferred. Specifically, the process described in U.S. Pat. No. 4,360,477 may be used and is incorporated herein by reference. In the process it is preferable to use a carbon monoxide to oxygen molar ratio of 2:1, anhydrous alkanol, e.g. methanol, a temperature 175°-186° C., and a pressure of 600-2500 psig.

Since this reaction is exothermic adequate cooling facilities need to be provided to maintain the reaction temperature within the desired range.

The bisphenol used in steps A and C above is suitably selected from the group of bisphenol, bisphenol A, tetramethyl bisphenol A and tetrabromobisphenol A.

The transesterification reaction in step A is also well known in the art. For instance, a process of this type is described in U.S. Pat. No. 4,452,968 which is incorporated herein by reference.

In this process a carbonate oligomer is produced along with an alkyl ester by reacting a dialkyl carbonate with a bisphenol diester in the presence of a catalyst. More specifically, by reacting dimethyl carbonate with bisphenol A diacetate, the reaction product is methyl acetate and a carbonate oligomer.

The catalyst is suitably a titanate, e.g. a tetraphenyl titanate and the reaction is carried out at about 180°-300° C., at a pressure from 585-2315 KPa in an inert atmosphere such as nitrogen. The reaction may be graphically represented as follows:

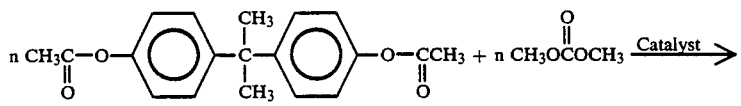

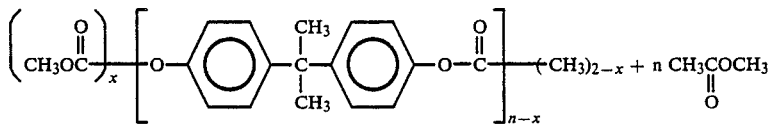

In the above reaction step A, the alkyl ester is separated from the oligomer by distillation, the ester being volatile at the reaction temperatures used and can be continually removed from the reaction mixture.

The alkyl ester recovered from the above reaction or a fresh aliquot thereof may be carbonylated to the corresponding anhydride according to step B. The product of this reaction can be a mixture of acetic acid and acetic anhydride. This mixture can be used to esterify the bisphenol A.

Where the alkyl ester is e.g. methyl acetate, this can be catalytically carbonylated to acetic anhydride by known processes. For instance, Japanese patent no. 60/199853 (Daicel) describes such a process using a catalyst consisting of $RhCl_3 \cdot 3H_2O$, methyl iodide and aluminium triacetate in acetic acid, operating at partial pressure of CO (40 bar) and $H_2$ (5 bar) and at a temperature of 170° C. for 1 hour.

An alternative route for carbonylation is described in EP-A-170964 (Hoechst) using a catalyst system consisting of a Group VIII metal compound, an iodine compound and a teritary butylphosphonium iodide as an additional promoter, and operating at 350–575 K. and 1–300 bar pressure.

The anhydride formed in step B can be reacted with the bisphenol to form the bisphenol diester according to step C above. In the case of acetic anhydride being formed from methyl acetate in step B, this can be reacted with bisphenol A at about 140° C. to quantitatively form bisphenol A diacetate. This reaction can be achieved without the use of a catalyst.

The carbonate oligomer separated in step A may be polymerised to a high molecular weight polycarbonate by heating the oligomer to a temperature above 250° C., preferably above 270° C., if necessary under a mild vacuum applied to the polymerisation reactor. The polymer product of the reaction, which proceeds rapidly, is a viscous material at the polymerisation temperature. This product can be purified after removal from the reaction by conventional methods such as e.g. by separation of the polymer from the catalyst residues by solvent extraction followed by removal of the solvent from the polymer followed by cooling. The resultant dry polycarbonate resin is a hard material having an infra-red spectrum closely matching the infra-red spectrum of a commercial polycarbonate resin and can be extruded as desired.

The present invention is further illustrated with reference to the following Examples.

EXAMPLE (a) Preparation of Bisphenol A Diacetates from Bisphenol A and Acetic Anhydride Into a 1 liter flask fitted with a thermometer and Oldershaw column equipped with a receiver was charged 200 g (0.88 moles) bisphenol A and 400 g (3.92 moles) acetic anhydride. The mixture was heated to 145° C. under total reflux. The mid-point of the Oldershaw column was maintained at 130° C. and the acetic acid formed during the reaction was collected in the receiver. Once the stillhead temperature began to rise above 117.5° C. the source of heat was removed and the liquid product transferred to a rotary evaporator. The excess acetic anhydride and any remaining acetic acid in the product was removed and the resultant residue was recrystallized from heptane. This gave white crystals of bisphenol A diacetate which had a melting point of 92° C. to 93° C.

(b) Preparation of Oligomer

Dimethyl carbonate (0.25 mol) was heated at 220° C. with bisphenol-A diacetate (from (a) above) (0.25 mol) and tetrapropyl titanate (0.005 mol) in a stainless steel vessel pressurised with nitrogen to 14 bar. After 1 hour a mixture of unreacted dimethyl carbonate and methyl acetate was vented. The vessel was cooled, and a further aliquot (0.05 mol) of dimethyl carbonate was added. The vessel was heated at 220° C. under a pressure of 10 bar for a further 1 hour and the volatiles were again vented. The residue so formed was the oligomer which was hard and straw coloured and was retained for use in (c) below.

(c) Preparation of Polycarbonate

A portion of the oligomer from (b) above was transferred to a 100 cm³ stainless steel sphere fitted with an outlet pipe connected to a vacuum pump. The sphere was heated for 30 minutes at 300° C. in an oven. Throughout this period the pressure was held at 20–100 mm Hg. On cooling a hard polymeric substance was obtained whose infra-red spectrum closely matched the infra-red spectrum of commercial polycarbonate resin.

(d) Conversion of Methyl Acetate to Acetic Anhydride

Methyl acetate and unreacted dimethyl carbonate were recovered from stages A and B and separated by fractional distillation using a 10 plate column. The resulting heads fraction boiling at 57°–58° C. contained greater than 98% methyl acetate which was converted to acetic anhydride as follows.

Methyl acetate (0.187 mol) acetic acid (0.323 mol) N-methylimadazole (0.023 mol), methyl iodide (0.058 mol) and $[Rh(CO)_2Cl]_2$ (0.0003 mol) were mixed and placed in a 100 cm³ Hastelloy autoclave which had been purged with carbon monoxide. This was then charged to 3500 KPa with carbon monoxide and heated at 185° C. The pressure was maintained at 3500 KPa by addition of carbon monoxide. After 2 hours the autoclave was cooled and vented. The charge and liquid product were analysed by gas liquid chromatography. The final solution contained 0.123 mol acetic anhydride and 0.389 mol acetic acid.

In a comparative example using 0.181 mol methyl acetate produced by the esterification of methanol with acetic acid the final solution contained 0.117 mol acetic anhydride.

I claim:

1. An integrated process for producing polycarbonates, said process comprising:

A. reacting in a transesterification reaction a dialkyl carbonate with a bisphenol dicarboxylate in contact with a catalyst to form a carbonate oligomer and an alkyl ester, and separating the alkyl ester from the oligomer;

B. carbonylating the alkyl ester from step A with carbon monoxide in the presence of a carbonylation catalyst to form a product comprising an anhydride;

C. reacting the product comprising the anhydride from step B with a bisphenol to form the bisphenol diester, and recycling the diester to step A; and D. heating the oligomer from step A in contact with a catalyst to form the polycarbonate.

2. A process according to claim 1 wherein the dialkyl carbonate in step A is dimethyl carbonate or diethyl carbonate.

3. A process according to claim 1 or 2 wherein the transesterification in step A is carried out in the presence of a tetraphenyl titanate catalyst at a temperature from 180°–300° C. or a pressure from 585–2315 Kilo pascals in an atmosphere inert under the reaction conditions.

4. A process according to claims 1 or 2 wherein the alkyl ester by-product from step A is methyl acetate and the anhydride formed by the carbonylation thereof in step B is acetic anhydride.

5. A process according to claims 1 or 2 wherein the anhydride formed in step B is reacted with the bisphenol at 140° C. to form the bisphenol diester.

6. A process according to claims 1 or 2 wherein the carbonate oligomer formed in step A is polymerised to form a high molecular weight polycarbonate in step D by heating the oligomer to a temperature above 250° C. in a mild vacuum.

* * * * *

UNITED STATES PATENT AND TRADEMARK OFFICE
CERTIFICATE OF CORRECTION

PATENT NO. : 4,954,613

DATED : September 4, 1990

INVENTOR(S) : BARRY HUDSON

It is certified that error appears in the above-identified patent and that said Letters Patent is hereby corrected as shown below:

Column 6, line 4;

Claim 3, l. 4, correct the spelling of "kilo"

Signed and Sealed this

Twenty-eighth Day of April, 1992

*Attest:*

HARRY F. MANBECK, JR.

*Attesting Officer*      *Commissioner of Patents and Trademarks*